Figure 1:
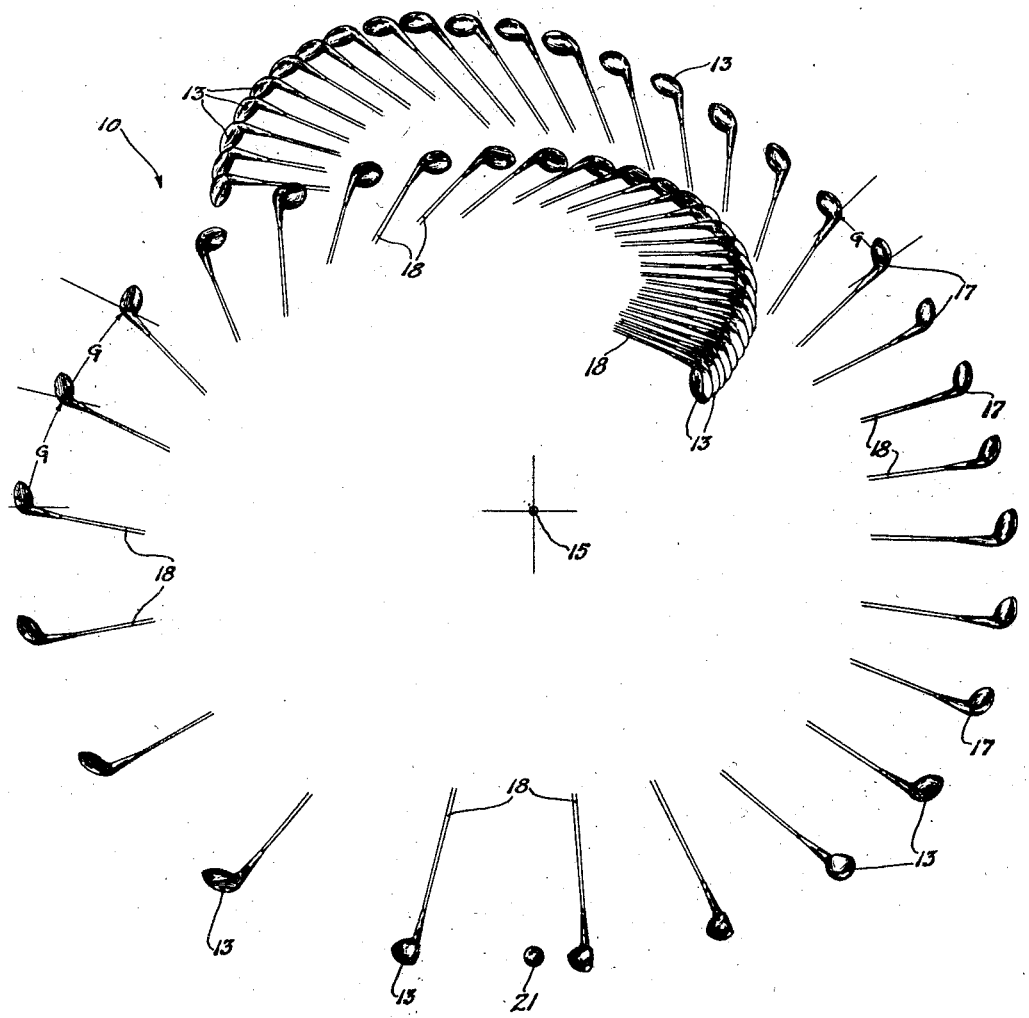

Dec. 3, 1940.　　B. B. FOGLER ET AL　　2,223,849
MEANS FOR ANALYZING MOTION
Filed May 4, 1939　　2 Sheets-Sheet 1

INVENTOR
Ben B. Fogler
BY Herbert E. Grier
ATTORNEY

INVENTOR
Ben B. Fogler
Herbert E. Grier
BY William P. Peyrer
ATTORNEY

Patented Dec. 3, 1940

2,223,849

UNITED STATES PATENT OFFICE 2,223,849

MEANS FOR ANALYZING MOTION

Ben B. Fogler, Belmont, and Herbert E. Grier, Cambridge, Mass., assignors to Arthur D. Little, Incorporated, Cambridge, Mass., a corporation of Massachusetts Application May 4, 1939, Serial No. 271,736

3 Claims. (Cl. 283—1)

This invention relates to a means for the dynamic analysis of motion, particularly rotatory motion.

In the study and analysis of the motion of any object it is frequently desired to have a simple and convenient method and means by which specific characteristics of or factors relating to such motion—e. g., velocity, acceleration, momentum, centrifugal force and centripetal force—can be determined and presented in a manner readily understandable.

The present invention is particularly useful for this purpose in the analysis of motion which is rotatory, or substantially so. While this invention may be used for the analysis of machine parts or apparatus having such motion, it finds particular use in the analysis of human actions and movements, wherein the rotatory motion is more or less irregular with respect to velocity, acceleration, and other factors, due to the human element involved.

The present invention thus provides a device or means whereby the actions and movements of one or any number of individuals, in performing a specified type of rotatory motion, may not only be presented and analyzed, but may be compared with one another in a graphic and easily understood manner. Thus, for example, the motions and performance of a novice may be compared with those of an expert, as for the purpose of detecting and correcting errors and faults.

A particular application of the present invention is with respect to the analysis of the swing of golf clubs in their customary use by different individuals, and the following disclosure will be directed primarily to such application as an example of the invention. It should be understood, however, that many other types of rotatory motion may be analyzed in this manner, including mechanical as well as human motion, as already pointed out. The motion may be in any plane, as for example in golf where the motion is substantially in a plane inclined relative to the vertical, or in baseball where the motion of the bat is substantially in a horizontal plane. Furthermore, the motion may go completely through 360° or more, as in the usual full swinging of a driver in golf, or it may be only a portion of the full circle, as in the usual swing of a putter, or as in a number of other sports such as tennis, rowing, and bowling.

In carrying out the present invention, the object the motion of which is to be analyzed, is photographed in a series of successive positions in its path of movement, for example by a multi-flash high-speed photographic technique such as developed by H. E. Edgerton, K. J. Germeshausen, and H. E. Grier, at Massachusetts Institute of Technology. The latter procedure provides in a single photograph or other reproduction, a representation in one plane of the motion of an object in space, the representation being produced by successive images of the object as it goes through its path or cycle of movement, these images being spaced at known and preferably uniform intervals with respect to time.

A sheet of polar coordinate graph paper or the like is then superposed upon the photograph, with its center directly over the center of rotation of the object. In the case of the golf swing, the center of rotation of the golf club varies somewhat during its substantially rotatory movement and as used hereinafter the words "center of rotation" are to be understood as covering the average or approximate center of rotation.

Inasmuch as the time intervals between successive angular positions of the images of the object as represented in the picture are known it is a relatively simple matter to calculate the quantitative values of divers factors relating to the motion of the object, such for example as velocity and acceleration. These values are then plotted and curves drawn therethrough on the graph in such a way that the quantitative values represented by the curves at any given point correspond with the angular position of the graphical representation or image of the object in line therewith. By looking at the device thus constructed, therefore, it is possible to determine at a glance the variations, if any, of factors, such as velocity and acceleration, relating to the motion of the object as the latter goes through its path or cycle of movement.

Figure 2:
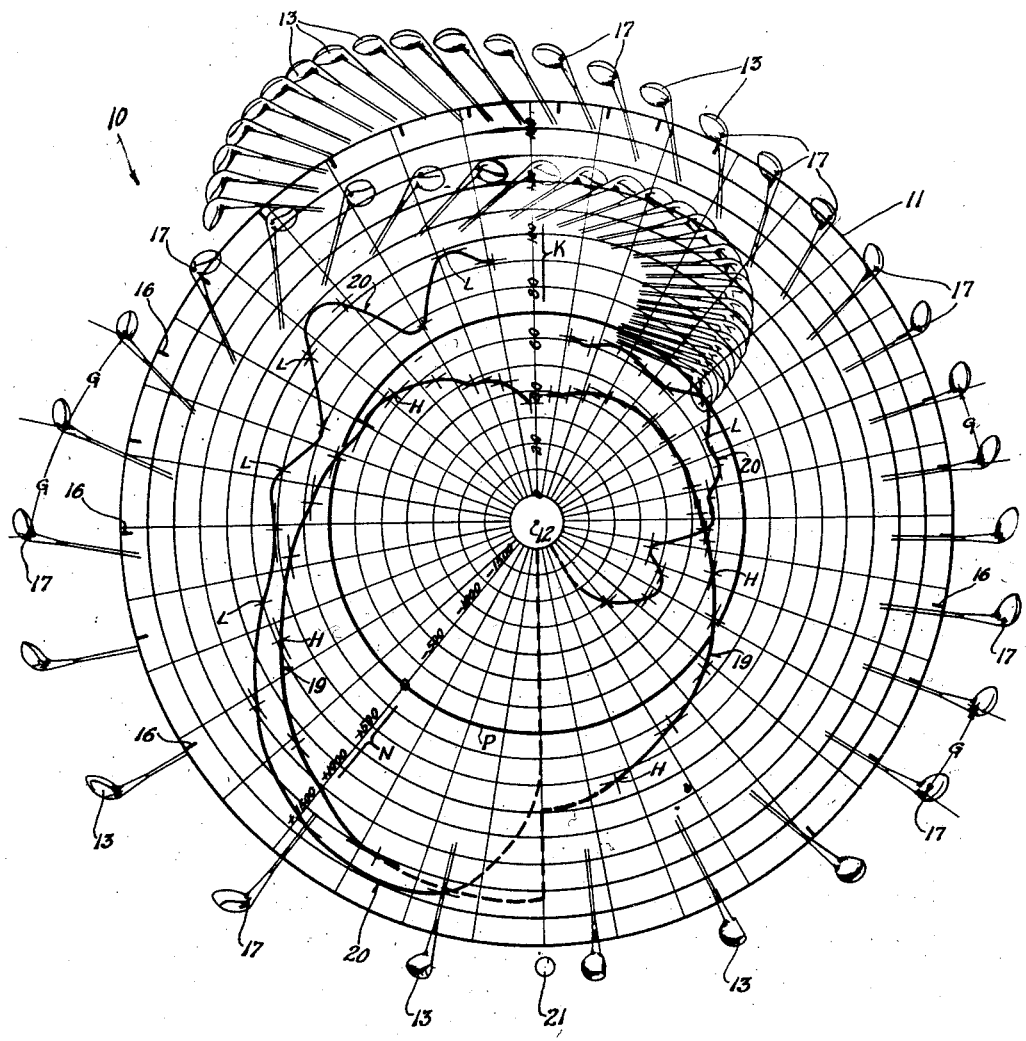

The foregoing procedure will now be described in detail, with reference to the accompanying drawings, wherein:

Fig. 1 is a diagrammatic showing representing a multiple-flash high-speed photograph of the swing of a golf club; and Fig. 2 shows the same overlaid with graph paper upon which the motion has been plotted and charted with respect to velocity and acceleration characteristics.

The multi-flash high-speed photographs may be obtained by procedures, such as that identified above, which are already described in the literature (see Industrial & Engineering Chemistry, news ed., vol. 16, No. 24, Dec. 20, 1938, p. 673), and the particular steps by which such photographs are taken do not per se form a part of the present invention. The negative obtained by such photographic technique may be used as such, although it is preferably transferred and enlarged onto a positive print, or may be otherwise reproduced. A representation of such a picture 10 is shown in Fig. 1, wherein are shown successive points in a complete swing of a golf club at intervals of 1/100 second.

Alternatively, although less simply, the photograph or reproduction may be obtained by superimposed printing of successive frames of high-speed motion picture films.

Preferably and to obtain the most accurate results the camera should be so set up that it is directed at the center of rotation and at a right angle to the plane of rotation of the object. In this manner a most accurate representation of the motion of the object in its plane of rotation is obtained.

The center of the rotational motion of the moving object in the photograph or other reproduction is then determined, and a sheet of polar coordinate graph paper 11 is placed in surface contact with the photograph in such a position that said center of the rotational motion is directly under the center 12 of the graph paper. The graph paper may advantageously be more or less translucent or transparent, to facilitate this positioning and to allow other parts of the photograph to be seen through it, but such translucency or transparency is not always necessary. Alternatively, the photograph may be more or less translucent or transparent, and be laid over an opaque graph paper; or both may be more or less translucent or transparent, if desired for special purposes such as for projection upon a screen by transmitted light. Whichever of these procedures is followed, the analysis and charting of the motion will be essentially the same, and will now be described with reference to Fig. 2.

Since it is desired in the example given to consider factors, such as velocity and acceleration, relating to the motion of a golf club head rather than the motion of any other part of the golf club, the center of rotation is selected with relation to the images of the golf club head 13. As shown in Fig. 2, the sheet 11 of polar coordinate graph paper is then laid over the photograph 10 represented in Fig. 1 in such a way that the center 12 of the graph paper is directly over the center of rotation or point of reference 15 of the photographic record of the club head. The angular positions of the images of the golf club head preferably are then marked on the graph paper, as by short radial lines 16, which are portions of lines connecting the center or point of reference 12 of the graph paper 11 with a selected point on the image of the object, in this case the golf club head, the characteristics of the motion of which are to be analyzed.

For convenience, and as shown, the selected point 17 on the club head chosen in marking the angular positions thereof, is the junction of the shaft 18 and the heel of the club head. At times it may be desirable to select some other point than the heel of the club as a basis for determining and marking the angles between successive images of the club head. Generally, however, other points on the outside of the club head are somewhat less suitable due to the considerable twisting of the club head during the swing, as shown in Fig. 1 particularly. However, if desired a special golf club head might be utilized in the test, made of a light colored transparent material and having a suitable contrasting indicia, such as a black ball, within the club head at the center of gravity thereof. Such an indicia would show in the photographic images of the club and could be utilized as the selected point in marking the angular positions of the club with the short radial lines 16. In the illustration given in Fig. 2, the successive radial lines 16 represent identical time intervals of 1/100 second.

The velocity curve 19 is then calculated and plotted, as follows: The distance G between the selected point 17 on each two successive images of the club head as determined by the path of movement, is measured starting preferably at the top of the graph and working chronologically with the swing around the 360° circle to the top again. Overlapping portions of the swing at the beginning and end thereof and in excess of 360° are neglected in the example given but may be considered if desired. The actual value of the distances G can be readily calculated from the reduction factor of the photograph. Each of these distances is then divided by the time interval (1/100 second in this instance) and the resultant figures for average velocity, expressed in feet per second, are thus determined.

Of importance, in order that the velocity curve 19 may be drawn on the graph in such a way that it shows at a glance the quantitative value of the velocity of club head at any given angular position in its substantially rotatory movement, the computed values of the average velocity between successive recorded positions of the club head are plotted on the polar coordinate graph chart as points H which are respectively located midway of the angle determined by the radial lines 16 marking the angular advance of the club head during the particular time interval for which average velocity was computed. Thus, when the velocity curve 19 is drawn through the points H, the quantitative value represented by the velocity curve at any given point corresponds with the angular position of the graphical representation club head 13 in line therewith. For the purpose of thus plotting the velocity, a suitable scale K is provided in any convenient location on the graph. As shown, the scale is so located that the velocity curve lies within the path of the head as represented by the images. If desired, however, it will be understood that the polar graph chart may be made annular in shape and of such a size that the images of the club head may be seen through the opening in the middle of the chart and the scale so located that the velocity curve lies outside the path of the head as represented by the images.

An acceleration curve 20 may likewise be plotted on the graph paper 11 in such a way that the quantitative value represented by the curve at any given point corresponds with the angular position of the graphical representation of the club head in line therewith. In calculating the quantitative value of the average acceleration at any given recorded position of the club head, the computed average velocity during the time interval just preceding that position is subtracted from the computed average velocity during the time interval immediately following it, and the result then divided by the time interval, which in the example illustrated is 1/100 second. The resulting values are then plotted as points L and the acceleration curve 20 is drawn therethrough. The points L representing the respective computed values of the average acceleration are plotted on the polar coordinate graph chart in line with the radial line 16 marking the angular position of the club head for which that particular average acceleration was computed. Hence, similarily to the velocity curve 19, the acceleration 20 curve shows at a glance the quantitative value of the acceleration of the club head at any given angular position in its substantially rotatory movement. To facilitate plotting the acceleration curve 20, a suitable scale N is, as shown, preferably provided which may represent the acceleration in feet per second per second. Inasmuch as the acceleration ordinarily will in some instances be positive and in others negative, the scale N will extend on both sides of zero. Hence a zero circle should preferably be provided as indicated at P.

While as shown, the acceleration curve 20 lies within the path of the club head as represented by the images, it may if desired, and as explained in connection with the velocity curve, be drawn outside the path of the head as represented by the images, as by using a polar coordinate graph chart which is annular in shape. Also, while in the illustration given in Fig. 2, the curves 19 and 20 representing velocity and acceleration do not extend so as to show the quantitative value of these factors at the beginning and end of the golf club swing, it will be readily appreciated that the quantitative values of these factors may be computed and the curves extended to pass through points representing the same on the graph chart. Such an extension of the curves may well be desired at times in the actual practice of the invention to give a more complete analysis of the swing.

In the illustration shown in Fig. 2, the frequency of light flashes was not sufficient to show the action at impact; hence the curves are dotted at this point to show their approximate position. These curves break sharply at impact, as it is obvious that both velocity and acceleration change suddenly when the ball 21 is struck. The configuration of these dotted lines in Fig. 2 has been verified by additional analysis of this same type taken at other speeds and with other timing.

The club swing shown in Figs. 1 and 2 is that of an expert golfer, and it will be noted that the acceleration and velocity curves are reasonably smooth and regular and that they show steadily increasing velocities (and hence positive acceleration) prior to impact and steadily decreasing velocities (and hence negative acceleration) subsequent to impact. A similar analysis of the swing of a less experienced golfer or of a novice shows irregularities in these graphs, or failure to develop or maintain a suitable velocity, or excessive velocity and even positive acceleration subsequent to impact, or other errors or faults. Inasmuch as the present method and means of analysis serves to indicate the nature of these errors and faults, and where they occur in the swing, and to what extent, this serves as a guide to correcting these matters and improving the swing.

To enable a most direct and accurate comparison of the swing of a novice with that of an expert, for example, indicia representing the angular positions of the club head at known or predetermined time intervals in a swing by an expert may be marked on the graph chart and these compared with the corresponding positions of the club head at corresponding intervals of time in a swing by a novice. And if desired, instead of the above or in addition to the above, indicia representing the quantitative values of a factor, such as velocity, relating to the motion of the golf club head when swung, for example, by an expert may be placed on the graph chart for comparison with corresponding indicia representing the quantitative values of a factor relating to the motion of a golf club head swung by a novice.

As already stated, it is obvious that the procedure of the present invention is not limited to the analysis of swings in golf, but may be applied in the manner herein described to the analysis of other rotatory motion. Also, in addition, to the curves or indicia representing velocity and acceleration, other indicia or curves representing other factors relating to the motion of an object may be plotted on the polar coordinate graph so as to show at a glance, because the graphical representations of the club head and the indicia are angularly in phase, the value of these factors at any given position of the object in its path of movement.

Having thus described the invention, what is claimed as new is:

1. A device for analyzing the motion of an object comprising a sheet having thereon a photographic record of and showing the object in a plurality of successive positions in its path of movement; said photographic record having a point of reference; and a chart associated with said photographic record having indicia thereon graphically representing quantitative values of a factor relating to the motion of the object in said successive positions; said chart having a point of reference; said chart and said photographic record being superposed and said points of reference being coincident; and said indicia and said photographic record being in phase and in alignment with each other.

2. A device for analyzing the motion of an object comprising a sheet having thereon a photographic record of and showing the object in a plurality of successive positions in its path of movement; said photographic record having a point of reference; and a chart associated with said photographic record having indicia thereon graphically representing quantitative values of a factor relating to the motion of the object in said successive positions; said chart having a point of reference; said chart and said photographic record being superposed and said points of reference being coincident; said indicia and said photographic record being in phase with each other; and said indicia bearing the same relation to the reference point of the chart as the photographic record bears to its reference point.

3. A device for analyzing rotary motion of an object comprising a sheet having thereon a photographic record of and showing the object in a plurality of successive positions in its rotary path of movement; said photographic record having a point of reference; and a polar chart associated with said photographic record having indicia thereon graphically representing quantitative values of a factor relating to the motion of the object in said successive positions; said chart having a point of reference; said chart and said photographic record being superposed and said points of reference being coincident; and said indicia and said photographic record being in phase and in alignment with each other.

BEN B. FOGLER.
HERBERT E. GRIER.